United States Patent [19]

Fox et al.

[11] Patent Number: 4,689,798
[45] Date of Patent: Aug. 25, 1987

[54] TRANSVERSE RING RF LINE FOR $CO_2$ LASER

[75] Inventors: Clifton S. Fox; John E. Nettleton; Dallas N. Barr, all of Prince William County, Va.

[73] Assignee: The United States of America as represented by the Secretary of the Army, Washington, D.C.

[21] Appl. No.: 891,019

[22] Filed: Jul. 31, 1986

[51] Int. Cl.$^4$ .............................................. H01S 3/097
[52] U.S. Cl. ...................................... 372/82; 372/87; 372/69; 372/4
[58] Field of Search ................... 572/82, 87, 64, 4, 55, 572/69; 313/15

[56] References Cited

U.S. PATENT DOCUMENTS

| | | | |
|---|---|---|---|
| 4,509,176 | 4/1985 | Marchetti et al. | 372/82 |
| 4,559,466 | 12/1985 | Donaldson et al. | 372/34 |
| 4,618,961 | 10/1986 | Sutter, Jr. | 372/82 |

*Primary Examiner*—Léon Scott, Jr.
*Attorney, Agent, or Firm*—Max L. Harwell; John E. Holford; Anthony T. Lane

[57] ABSTRACT

A far-infrared laser structure is provided wherein a uniform longitudinal electric field mode is provided for a radio frequency pump by means of a set of fully or near-fully circular ring shaped electrodes.

13 Claims, 5 Drawing Figures

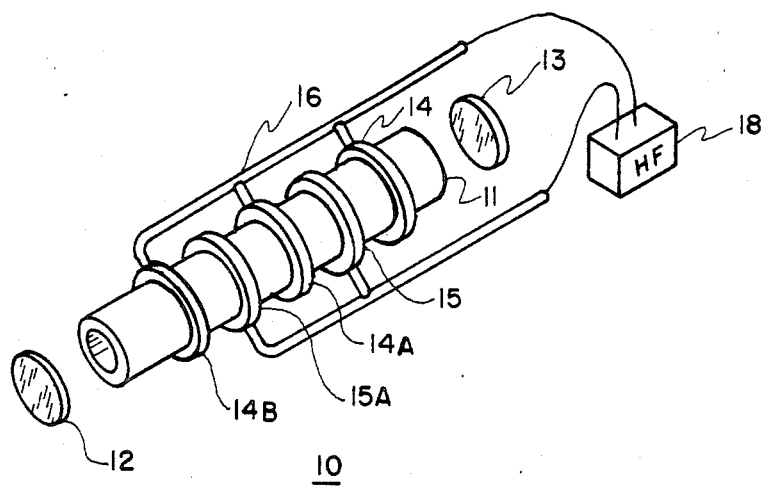
FIG. 1
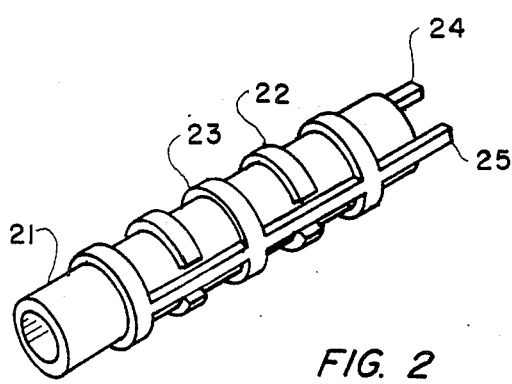
FIG. 2
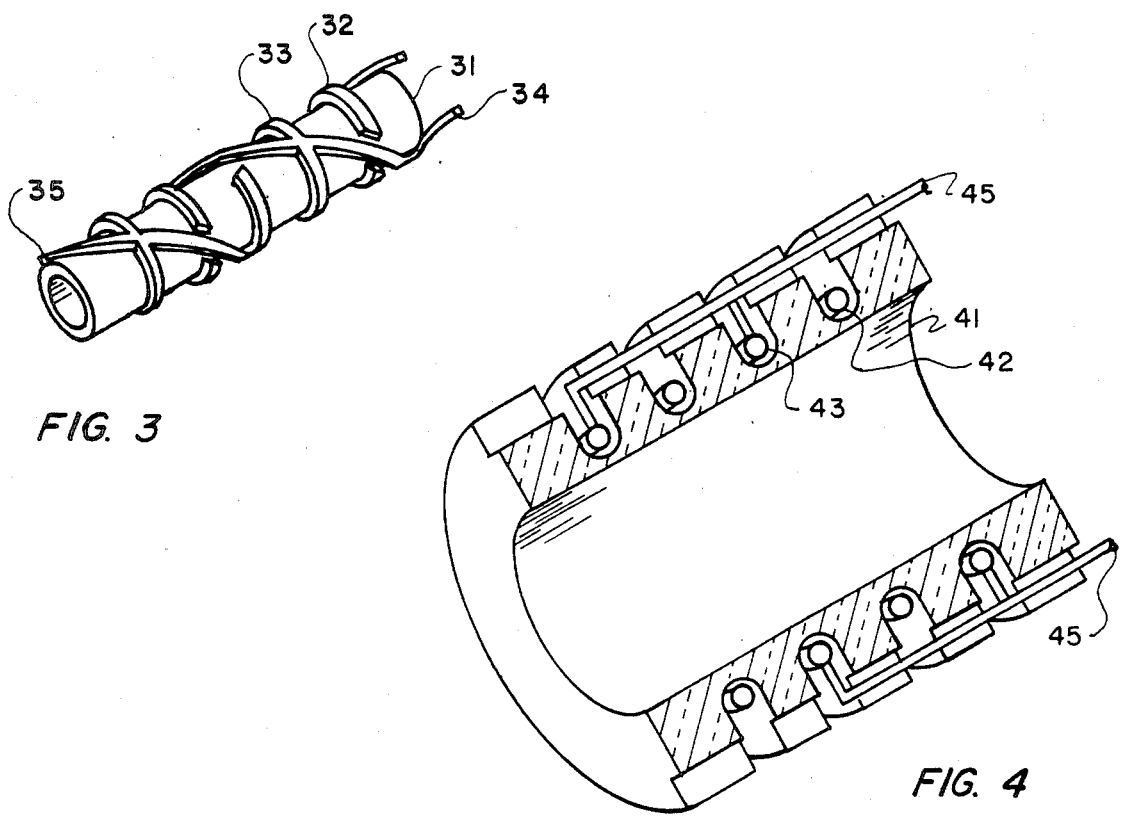
FIG. 3
FIG. 4

TRANSVERSE RING RF LINE FOR CO₂ LASER

The invention described herein may be manufactured, used, and licensed by the U.S. Government for Governmental purposes without the payment of any royalties thereon.

BACKGROUND OF THE INVENTION

1. Field of the Invention

The invention involves a polyatomic gas laser pumped by means of a radio frequency (RF) generator of electromagnetic radiation (EMR). Of particular interest is a $CO_2$-He-Xe laser which produces radiation in the far infrared band from 8–12 microns. The term RF as used herein will usually cover a frequency band from 1 to 300 megahertz.

2. Description of the Prior Art

A typical prior art structure is shown in U.S. Pat. No. 3,537,030, "Gas Laser Device with Means for Indicating Optimum Discharge Conditions", granted Oct. 27, 1970 to L. P. Dorbec et al. This patent discloses a gas laser of the type indicated above, which is pumped by an RF transverse electric field. An improvement on this type of laser is disclosed in U.S. Pat. No. 4,373,202, "RF Excited Waveguide Gas Laser" granted Feb. 8, 1983 to Katherine D. Laakmann et al. This patent employs a more efficient longitudinal electric field generating electrode structure of interdigitated fingers attached to the optical waveguide wall.

SUMMARY OF THE INVENTION

A novel transmission line structure for pumping a polyatomic gas laser is provided. The laser consists of an elongated ceramic tube surrounded by a plurality of ring shaped electrodes. The rings are alternate parts of a transmission line which extends along the axis of the tube.

BRIEF DESCRIPTION OF THE DRAWINGS

FIG. 1 shows a laser with a smooth surface ceramic tube and ring shaped electrodes bonded to the smooth surface, and raised line feed conductors;

FIG. 2 shows a laser, like that in FIG. 1 except that the line conductors are bonded to the tube and pass through gaps in the ring electrodes;

FIG. 3 shows a laser similar to FIG. 2 with gaps in the ring electrodes, and spiral line feed conductors which pass through the gaps;

FIG. 4 shows an embodiment similar to FIG. 1 wherein the gas tube includes grooves for both the line conductors and the ring electrodes.

DESCRIPTION OF PREFERRED EMBODIMENT OF INVENTION

Figure 5:
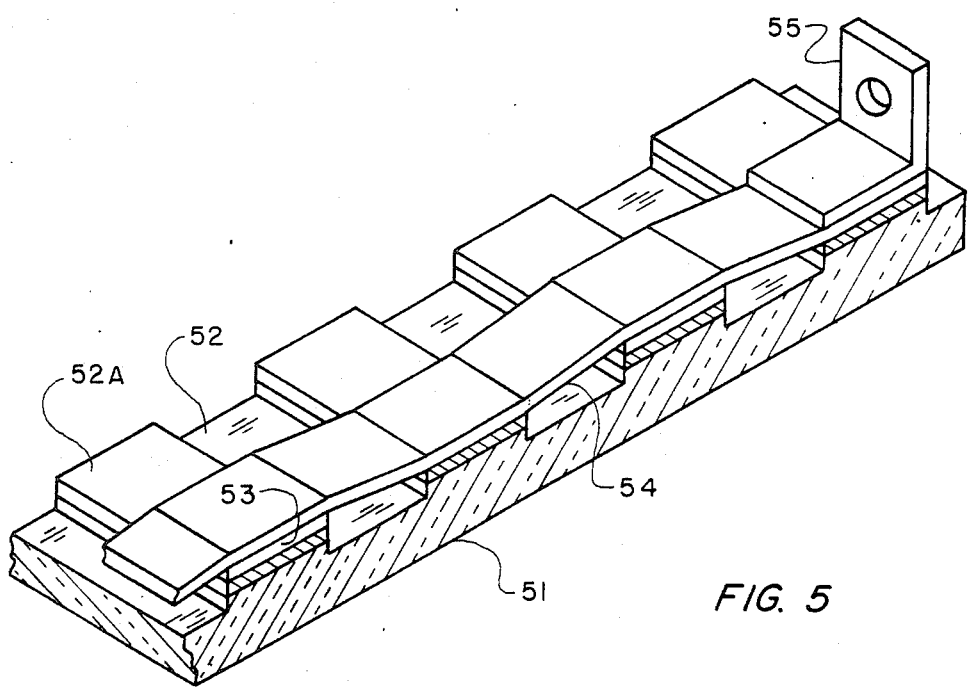
FIG. 5 shows an embodiment similar to FIG. 1 wherein a solid insulator is inserted between alternate ring electrodes on each line conductor with a male input terminal mounted on each line conductor.

As shown in FIG. 1 the laser 10 consists of a hollow ceramic tube "in its simplest form," i.e. circular outer cross-section with a circular opening in the center. The tube serves as a dielectric waveguide for the laser output, e.g. far-infrared from 8–12 microns. The central opening may be circular, square, oval, rectangular, or similar configurations to achieve a desired moding or polarization. The outer cross-section will normally follow suit to maintain a uniform wall thickness. The tube is filled with a suitable lasing gas, such as a mixture previously mentioned or a mixture of $CO_2$, $N_2$ and He, at a reduced pressure of 10–200 millibars and the ends are sealed with windows 12 and 13. These windows must be transparent to the output radiation frequencies of the laser and are sealed in place using epoxy or glass frit. In operation the tube 11 is placed in a Fabry-Perot cavity or such a cavity is formed within the tube by plating the inner surfaces of the windows 12 and 13 with partially reflecting mirrors.

The tube is surrounded with ring-shaped pumping electrodes. Alternate electrodes such as 14 and 15 are connected, respectively, to line feed conductors 16 and 17 which form a transmission line from a source of radio frequency (RF) electromagnetic radiation (EMR). The rings may be formed from wires of round cross-section, but the rings of rectangular cross-section conform better to the surface of the tube and may in fact be ribbon-like platings on the tube surface. The line feed conductors in the configuration shown must be sufficiently rigid that, when connected to rings 14, 14A, and 14B, they will not sag into direct contact with rings 15 and 15A. The rings can be brazed, soldered or even epoxied to the line conductors or the two can be formed together by injection molding, for example. The finished electrode structure preferably encompasses the full length of the gas filled portion of the tube.

FIG. 2 shows a modification of the FIG. 1 structure wherein the rings 22 and 23 on ceramic tube 21 have a gap opposite the section of the ring that is connected to or common with the line conductor 24. The gap is wide enough to admit the line conductor 25, to which it is not connected, without the danger of arcing there between. This is to say that the minimum spacing between rings and line conductors not in direct contact is about equal to 50% of the ring thickness and that rounding of sharp corners, as feasible, will be employed to allow the maximum voltage associated with that spacing. These rings thus extend around more than 75% of the circumference. The FIG. 2 configuration is amendable to plating using suitable masking techniques including photographically reproduced masks. Alternatively the electrodes 22 and 23 can be performed of tempered spring metal, so that they can be snapped onto the ceramic tube 21. Small detents, not shown, may be formed in the electrodes and ceramic tube to insure that the proper spacings specified above are maintained.

FIG. 3 shows a further modification of the structure of FIG. 2 wherein the line conductors 34 and 35 are spiral around the ceramic tube 31. This displaces the gaps in rings 32 and 33 uniformly around the circumference of the tube. When high-voltage RF-EMR is applied to these rings or those in FIGS. 1 and 2, longitudinal gas ionization discharges take place in the tube between each set of adjacent rings. The more evenly these discharges are distributed around the transverse circumference and axial length of the ceramic tube, the more efficient will be the coupling between the ionized gas and the optical IR TE11 mode propogating in the tube. The gaps in the rings, when present, introduce small deviations from symmetry which are minimized by spiraling the gaps around the tube. The spiraling of the feed conductors also provides an increased inductance in the load seen by the RF source to offset the large capacitance of the electrode structure.

FIG. 4 shows a modification of the FIG. 1 structure that is particularly adaptable to rings and line feed conductors of round cross-section. The ceramic tube 41 includes a series of deep circumferential grooves such as grooves 42 and 43, at the bottom of which are placed at the ring conductors 42A and 43A, etc. Two longitudinal grooves 44 and 45 of lessor depth contain the line feed conductors 44A and 45A. In addition to being round the conductors in this modification may also be stranded for greater flexibility, heat dissipation and current carrying capacity. The rings can be connected to the line feed conductors by short pieces of conductor, special clips; or the line feed conductors may simply loop down to every other ring and be fused to the ring's surface. Instead of making grooves 44 and 45 straight, as shown, these grooves may be spiraled in the manner of FIG. 3.

The conductor shape also may be other than round in cross-section and may be formed at least partially by plating tube 41. For example, the circumferential grooves 42 and 43 can be formed first and the entire outer surface of tube 41 plated with conductive material. The original or outermost surfaces would then be polished to remove the conductive material between these grooves. The longitudinal or spiral grooves 44 and 45 could be added after the above steps and the line conductors 44A and 45A brazed, soldered or glued to the platings representing ring electrodes 42A and 43A. If the configuration of FIG. 2 or FIG. 3 is used, then all grooves can be formed at once, as for example in a centrifugal molding step which forms tube 21 or 31 from molten glass or other dielectric material. As before the entire tube surface can be plated with a metal conductor and the conductor removed from the surface portions of the tube between the grooves.

FIG. 5 shows a further embodiment which most closely resembles the embodiment of FIG. 1. Tube portion 51, while shown flat in the FIGURE, is part of a cylinder. When the cylinder is coated with conductive material and grooves 52 normal to the cylinder axis are cut through the conductive material, continuous rings 52A of conductive material are formed. Of course this is simple when the tube is round and lathes are used, but rectangular and other shapes are also relatively easy to form. Every other ring electrode 52A is fitted with a pad or block 53 of electrical insulation material. A ribbon line feed conductor 54 is then placed across all of the ring electrodes and insulation pads. The line conductor again can be straight and normal to rings 52A as in FIG. 1 and FIG. 2 or spiral as in FIG. 3. A terminal electrode 55 may be fused to the input end of line feed conductor 54 or be formed from an extension of the line conductor. The terminal receives a conductor 18A or 18B from FIG. 1 for direct soldering on insertion in a female connector. It is preferred that the portion of the ring conductor or electrode and the line conductor which are in direct contact be welded or soldered together. The same type of structure is used to form a second line feed conductor using the remaining unused ring electrodes.

Any of the above structures can receive a final potting or glazing which further insulates the metal or conductive components while cementing all components in place and provides a smooth, abrasion resistant outer surface for mounting and adjusting the tube in a Fabry-Parot cavity or other device. A glass frit with a lower melting point than the other components may be used for example, particularly when the pads consist of ceramic material. Soldering of the metal components can be accomplished by the same heating operation that melts and/or cures the potting or glazing material. Alternatively, many plastics are available that can be formed at room temperature or less than the melting point of solders. The line conductors, rings and pads 53 can be epoxied in place, if desired. The dielectric potting materials should have a loss factor for RF-EMR energy which is less than $10^{-3}$.

We claim:

1. A gas filled waveguide laser tube for use in a Fabry-Perot cavity to generate electromagnetic radiation (EMR) within a far-infrared band of wavelengths, comprising:
   an elongated tube of dielectric material having a cross-section necessary to achieve a desired moding or polarization, said tube being characterized by low loss propagation of high frequency EMR;
   a pair of end caps hermetically sealing the ends of said tube, said caps being transparent to said far-infrared band of EMR;
   an ionizable polyatomic gas at low pressure within said tube;
   a pair of diametrically opposed line conductors extending along the axis of said tube for at least the length of the gas filled portion thereof and;
   a series of ring shaped electrodes having a defined cross-section alternately connected to said conductors and extending around and touching said tube normal to the axis thereof for at least 75% of its circumference, said rings being electrically coupled to said line conductors to form a transmission line for RF excitation.

2. A laser in accordance with claim 1, wherein: said line conductors extend parallel to said tube axis.

3. A laser in accordance with claim 1, wherein: said line conductors spiral around said tube axis.

4. A laser in accordance with claim 1, wherein: said line conductors are spaced from said tube; and ring electrodes are completely circular.

5. A laser in accordance with claim 1, wherein: said ring electrodes include a gap and; said line conductors contact said tube, pass through the gaps of approximately half of the rings and electrically contact the remainder of said rings.

6. A laser in accordance with claim 1, wherein: said ring electrodes are plated on said tube.

7. A laser in accordance with claim 1, wherein: said line conductors are plated on said tube.

8. A laser in accordance with claim 1, wherein: said tube contains external grooves therein to receive said ring electrodes.

9. A laser in accordance with claim 1, wherein: said tube contains external grooves therein to receive said line conductors.

10. A laser in accordance with claim 1, wherein: said rings and said line conductors are encapsulated in a meterial having a loss factor, for RF EMR energy, less than $10^{-3}$.

11. A laser in accordance with claim 6, wherein: said plating on said tube is continuous and is separated by grooves normal to said tube axis cut through said plating and slightly into said tube.

12. A laser in accordance with claim 6, wherein: said line conductors are insulated from every other one of said ring electrodes by a pad of electrical insulation material.

13. A laser in accordance with claim 11, wherein: said line conductors are insulated from every other one of said ring electrodes by a pad of electrical insulation material.

* * * * *